Patented Sept. 28, 1926.

1,601,505

UNITED STATES PATENT OFFICE.

JOHN WESLEY ORELUP, OF SPRINGFIELD, NEW JERSEY.

PROCESS FOR PRODUCING SACCHARINE.

No Drawing.   Application filed September 2, 1921. Serial No. 498,056.

The present invention relates to the manufacture of saccharine and more particularly to a process of producing saccharine by the oxidation of ortho toluene sulfamid.

Saccharine has heretofore been usually obtained from the oxidation of ortho toluene sulfamids in an alkaline solution of potassium permanganate. Potassium permanganate is an expensive oxidizing agent, however, and the cost of producing saccharine in this manner has been very high owing to the cost of this comparatively expensive oxidizing agent. Moreover, the product obtained by the use of permanganate is not very pure, having a melting point 4 or 5° below that of the pure saccharine due largely to the presence of small quantities of unoxidized ortho toluene sulfamid or of its decomposition products. Efforts to provide a cheaper method of oxidation have, however, not proven successful owing very largely to the failure to provide the right conditions for oxidation of the ortho toluene sulfamide to saccharine without the further oxidation of the saccharine or the production of other products.

An object of the present invention is to provide an efficient and cheap process of producing saccharine.

Another object of the present invention is to provide a process or method of obtaining saccharine in a substantially pure state by the oxidation of ortho toluene sulfamid.

A still further object of the invention is to provide a process of oxidizing ortho toluene sulfamid to saccharine by the use of the mixture of chromic acid and sulphuric acid or an acid solution of chromate or dichromate under such conditions as to efficently oxidize the ortho toluene sulfamid without oxidizing and destroying the saccharine produced.

With these and other objects in view the invention comprises the process described and set forth in the following specification.

In the process forming the subject matter of the present invention the ortho toluene sulfamid is oxidized in a solution of sulphuric acid and chromic acid of a strength sufficient to oxidize the ortho toluene sulfamid while the temperature and other conditions of operation are so controlled as to avoid the further oxidation and destruction of the saccharine produced. To this end the ortho toluene sulfamid is preferably dissolved in concentrated sulphuric acid and water is added if necessary to bring the acid to the desired concentration. The temperature of the mixture is then brought below 50° C., and preferably to approximately 40° C. Sodium dichromate crystals are gradually added with vigorous agitation and the mass is stirred for a period of time while maintaining the temperature preferably at 40° C. The temperature is finally raised to 45° C. and maintained at this temperature for a number of hours. These temperatures may be varied within limits but should not be allowed to fall below approximately 40° C. for any considerable length of time nor rise above approximately 50° C.

When the desired reaction is completed the mixture is cooled, preferably to a temperature of about 25° C., and is diluted with water and filtered. The saccharine is then washed with water until the green color of the chromium sulphate is washed out. The saccharine is now contaminated only with the impurities of the sulphuric acid, as for example lead sulphate, but contains no unchanged amide. To purify the product the damp mass is dissolved in an alkaline solution and filtered. A small amount of potassium permanganate solution is added until a permanent pink color is obtained. Sodium bisulphite is added to decolorize and dissolve the precipitated manganese dioxide. The saccharine is now precipitated with mineral acid, as for example hydrochloric acid, and the precipitate is separated from the solution. Starting with an amide of a melting point of from 150 to 154° C., the saccharine obtained by the above process melts at 226 to 227° C. as compared with a melting point of 219 to 221° C. of the saccharine obtained by the old permanganate process.

As an example to illustrate in detail a specific manner of carrying on the process the following proportions and method of procedure may be used:

50 parts by weight of ortho tolueno sulfamid are dissolved in 435 parts of 66° Bé. sulphuric acid and the mixture is stirred vigorously while 160 parts of water is added. The ortho toluene sulfamid is partly dissolved in the sulphuric acid solution and is partly in suspension. The ortho toluene sulfamid may be added directly to an acid solution of the strength resulting from the addition of water as above but it is preferred to first dissolve in concentrated acid and then dilute as better yields appear to be thereby obtained owing probably to the formation of an addition product between the amide and the sulphuric acid which tends to protect the amido group from oxidation.

The mixture of amide and acid is thereupon brought to a temperature of approximately 40° C. and 120 parts of sodium dichromate crystals are gradually added with vigorous agitation, the addition of the dichromate crystals taking about one hour. The vigorous agitation of the mixture is particularly desirable during this addition to avoid any tendency towards local overheating and consequent local destruction of saccharine as formed. The mass is maintained for approximately two hours at 40° C. while being thoroughly stirred. The temperature is then raised to approximately 45° and kept there between 5 and 6 hours. The mixture is then cooled to about 25° C. and diluted with about 200 parts of water. The saccharine is filtered from the solution and is washed with water until the chromium sulphate is washed out and the wash waters run clear of the green color of the chromium sulphate. The washed saccharine is thereupon dissolved in a solution of sodium hydroxide of a concentration of about 25%. A small quantity of potassium permanganate solution is added until a permanent pink color is obtained. The solution is then decolorized by the addition of sodium bisulphite and the precipitated manganese dioxide is dissolved. The saccharine is thereupon precipitated with hydrochloric acid and separated from the solution in a pure undiscolored condition.

It will be understood that some variation from the temperatures and proportions given above may be permitted. Temperatures below 40° C. are, however, to be avoided since the reaction cannot be usually carried on to completion below this temperature. Temperatures above 50° C. should also be avoided as part of the sulphamide is oxidized to ortho sulphamino benzoic acid and also orthosulpho benzoic acid. Concentrations of sulphuric acid and chromic acid materially below those specified above should also be avoided in order to obtain a satisfactory yield of saccharine. At the very extreme limits within which these factors should be maintained a concentration of not less than 50% by weight and a temperature not higher than 75° C. may be mentioned, although for practical purposes these temperatures are much outside the limits at which good results may be obtained and are to be avoided in practice.

Having described the invention what is claimed as new is:

1. A process for producing saccharine, which comprises mixing ortho toluene sulfamid with concentrated sulfuric acid, diluting said mixture with water in quantity not more than one-third the weight of said sulfuric acid, adding a dichromate to said mixture and maintaining the temperature of said mixture between 40° and 50° C. until said ortho toluene sulfamid is substantially oxidized.

2. A process for producing saccharine, which comprises mixing ortho toluene sulfamid with concentrated sulfuric acid, diluting said mixture with water in quantity not more than one-third the weight of said sulfuric acid, adding a dichromate to said mixture, maintaining the temperature of said mixture between 40° and 50° C. until said ortho toluene sulfamid is substantially oxidized and recovering the resulting saccharine.

3. A process for producing saccharine, which comprises oxidizing ortho toluene sulfamid with a mixture of chromic acid and sulfuric acid of 75% strength at a temperature between approximately 40° and 50° C.

4. A process for producing saccharine, which comprises forming a mixture of ortho toluene sulfamid and sulfuric acid of substantially 75% concentration or over, forming a chromic acid in said mixture and maintaining the temperature of said mixture between substantially 40° and 50° C.

5. A process for producing saccharine, which comprises mixing substantially 50 parts by weight of ortho toluene sulfamid with 435 parts of 66° Bé. sulfuric acid, adding 120 parts of sodium dichromate crystals digesting the resulting mixture at a temperature between 40° and 50° C. for from 5 to 6 hours, washing the resulting product with cold water, dissolving the washed product in sodium hydroxide and precipitating the dissolved saccharine with a mineral acid and separating the resulting precipitate.

6. A process for producing saccharine, which comprises adding concentrated sulfuric acid to ortho toluene sulfamid, diluting said acid to a concentration of about 75%, adding a dichromate, maintaining said mixture at a temperature of from 40° to 50° C. and recovering the saccharine formed.

7. A process for producing saccharine, which comprises oxidizing ortho toluene sulfamid with a mixture of chromic and sulfuric acids of a total concentration of approximately 75% at a temperature between 40° and 50° C.

8. The process for manufacturing saccharine which consists in subjecting ortho-toluene sulphamide, to the oxidizing action of chromic acid mixed with sulfuric acid and more than 50% concentration.

9. The process of manufacturing saccharine which consists in subjecting ortho-toluene sulphamide, to the oxidizing action of chromic acid, the chromic acid being generated within a mixture of orthotoluene sulphamide and sulfuric acid of more than 50% concentration, by addition of a chromic acid salt.

10. The process of making saccharine which consists in adding ortho-toluene sulphamide to a solution of sulfuric acid of 50° to 56° Bé. and an alkali bichromate, agitating the mixture and maintaining it at a temperature of approximately 40° C. until the desired color is obtained, cooling and diluting the mixture and separating the saccharine from the resulting mixture.

11. The process of making saccharine which comprises adding ortho-toluene sulphamide to a solution of sulfuric acid of 50° to 56° Bé. and an alkali bichromate, heating the mixture to approximately 40° C. and separating the saccharine from the mixture.

In testimony whereof, I affix my signature.

JOHN WESLEY ORELUP.